United States Patent [19]

Ahn et al.

[11] Patent Number: 4,458,536

[45] Date of Patent: Jul. 10, 1984

[54] MULTIAXIAL VIBRATION SENSOR

[75] Inventors: Byong-Ho Ahn, Wayland; Raymond Carroll, Andover; Kenneth Fertig, Sudbury; Michele S. Sapuppo, Andover; Howard L. Watson, South Weymouth; Marc S. Weinberg, Needham, all of Mass.

[73] Assignee: The Charles Stark Draper Laboratory, Inc., Cambridge, Mass.

[21] Appl. No.: 395,266

[22] Filed: Jul. 6, 1982

[51] Int. Cl.³ .................. G01V 1/16; G01P 15/13; G01P 15/02
[52] U.S. Cl. ............................ 73/652; 73/517 B; 367/178
[58] Field of Search ............. 367/185, 178; 73/652, 73/505, 517 B

[56] References Cited

U.S. PATENT DOCUMENTS

| 3,100,292 | 8/1963 | Warner, Jr. et al. | 367/185 |
| 3,252,339 | 5/1966 | Huang | 73/652 |
| 3,323,040 | 5/1967 | Wright | 73/517 B |
| 4,082,990 | 4/1978 | Stiles | 73/517 B |

FOREIGN PATENT DOCUMENTS 800935  1/1981  U.S.S.R. ........................ 367/178

*Primary Examiner*—Howard A. Birmiel
*Attorney, Agent, or Firm*—Weingarten, Schurgin, Gagnebin & Hayes

[57] ABSTRACT

A single vibration sensor having the capability of sensing vibration along three rotational axes as well as three translational axes and exhibiting consistent dynamics over a wide frequency range. The sensor includes an elongated mass formed of a generally rigid material suspended in a fluid within a housing. The exterior surface of the mass is spaced from the interior surface of the housing to permit limited freedom of motion of the mass within the housing. The mass is provided with multiaxial radial and axial electromagnetic suspensions, and is typically supported by a fluid within the housing. Rotational positioning is provided by a signal generator, torque generator combination. Vibration is sensed by additive or differential measurements of current changes in the coils of different axes of the suspensions or electromagnetic signal and torque generator combinations. The sensor is conveniently implemented as a single degree of freedom inertial gyroscope without the gyroscope wheel and adapted to permit sensing of current changes in coils provided to achieve suspension or suspension and signal and torque generation functions.

23 Claims, 15 Drawing Figures

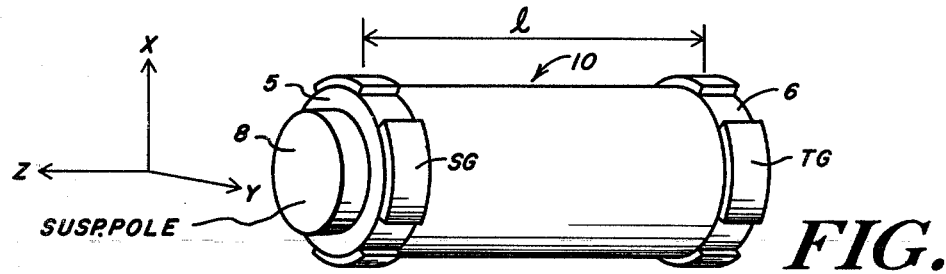
FIG. 1
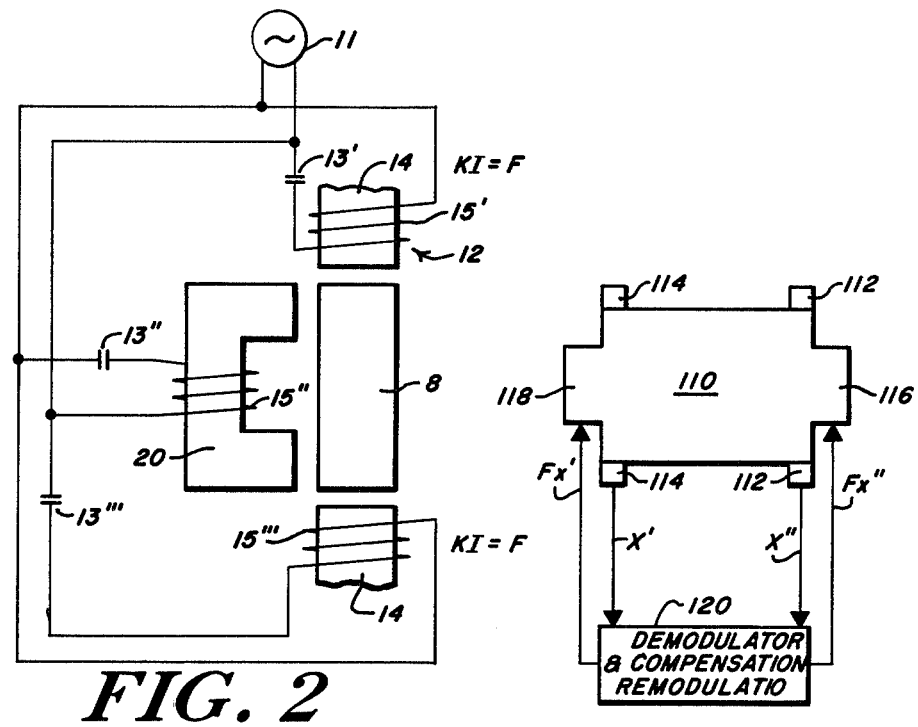
FIG. 2
FIG. 10
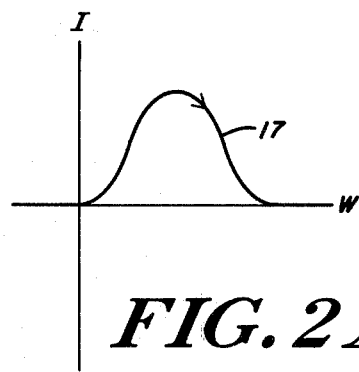
FIG. 2A
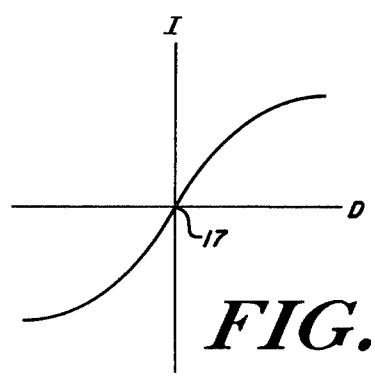
FIG. 2B

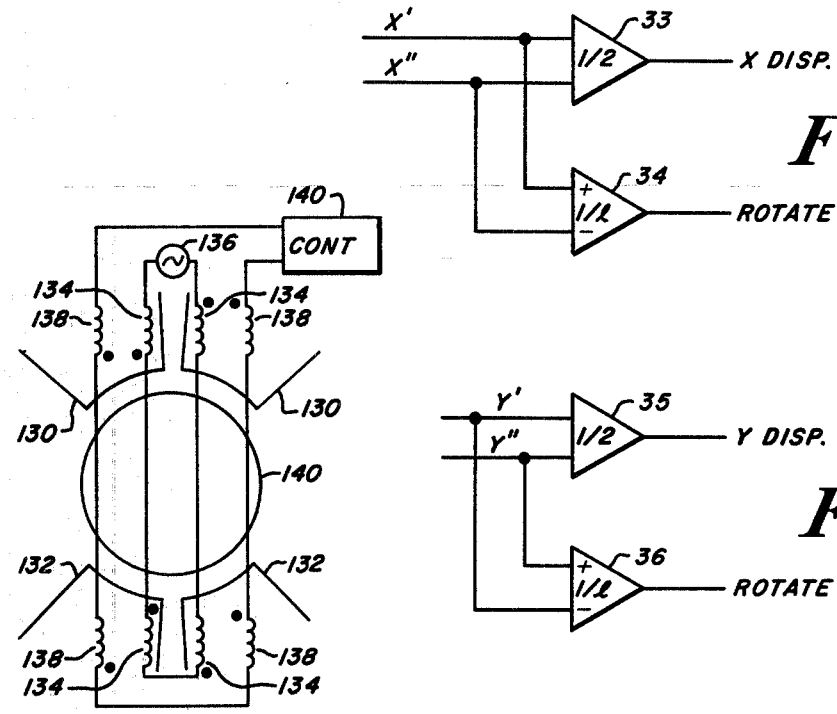
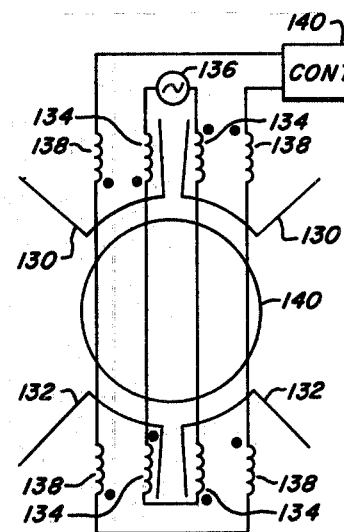
FIG. 6
FIG. 7
FIG. 11
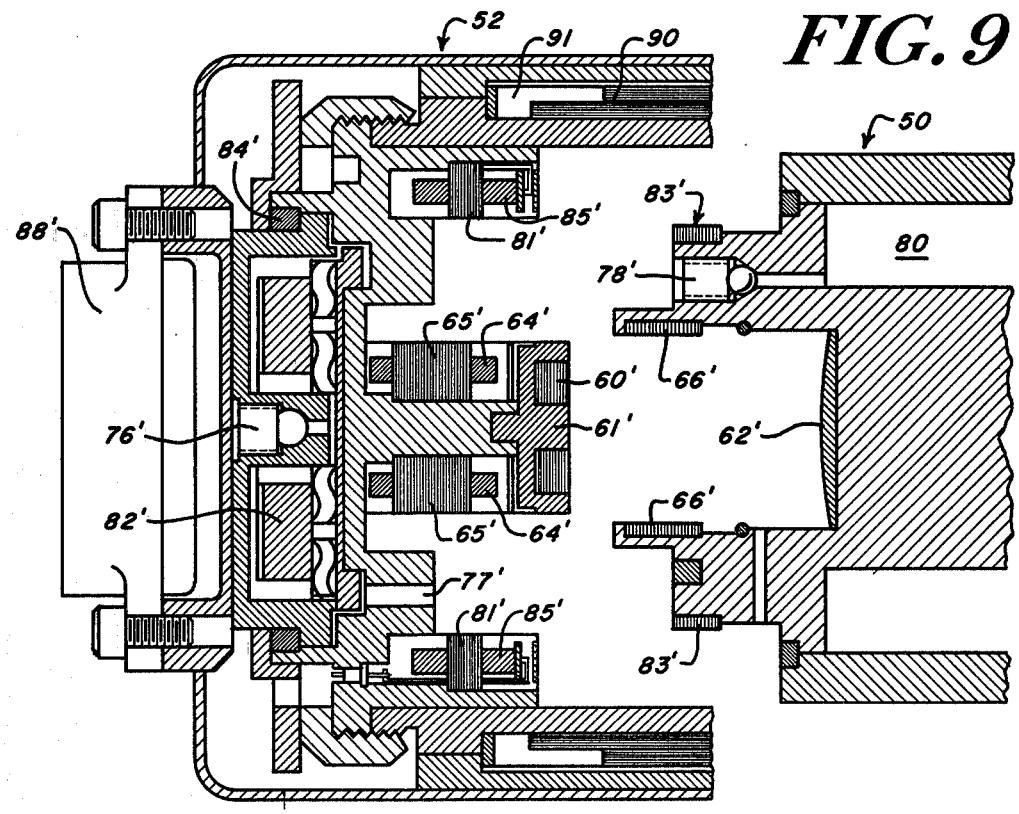
FIG. 9

MULTIAXIAL VIBRATION SENSOR

FIELD OF THE INVENTION

This invention relates generally to vibration sensors and more particularly, to sensing translational and rotational vibration over six degrees of freedom through a single instrument.

BACKGOUND OF THE INVENTION

The sensing of vibration in six degrees of freedom, three translational and three rotational axes, has application in space environments and elsewhere. In space it is particularly desirable to limit size and weight through the use of a single instrument previously unavailable for sensing all six degrees of freedom. Where six degrees of freedom are sensed by different instruments, the alignment between their axes can vary, necessitating recalibration in the field. There also results the possibility of errors from positionally dependent vibration. An additional problem in sensing multiple axes is encountered in trying to provide consistent dynamics over a wide frequency range; because dynamics are known and consistent, external compensation extends the useable bandwidth by accounting for suspension damping and natural frequency. Typically this goal is thwarted by the presence of an extraneous mass, such as a suspension fluid, whose motion at some frequencies contributes an excessive error to the sensed vibration.

The sensing of multiple axes of acceleration can be achieved by multiples of single axis accelerometers. These are well known and normally use a pendulous mass or proof mass carrying a displacement transducer and electromagnetic torquer and are adapted for pivotal movement along one axis in response to acceleration. The proof mass moves between a pair of spaced magnets carrying the fixed elements of the transducer, so that the latter generates an output signal which activates the torquer and causes the proof mass to return to a null position, the signal being proportional to acceleration along this axis. An example of such an accelerometer is shown in U.S. Pat. No. 4,047,439.

Multiaxial accelerometers or sensors are also available and require more than one proof mass. An example of such an accelerometer may be found in U.S. Pat. No. 3,710,629. Single mass, three axis accelerometers are disclosed in U.S. Pat. No. 3,280,641 and 3,680,392. U.S. Pat. No. 3,280,641 discloses an ultrasonic proof mass support and position readout, while U.S. Pat. No. 3,680,392 utilizes electrostatic sensing and mass support. However, none of these patents teaches means for sensing and torque balancing so as to give a readout of rotational dynamic inputs. Other accelerometric components are shown in U.S. Pat. Nos. 3,823,990; 3,167,962; 3,293,920; 3,363,470; 3,961,536; and 3,973,442. In all cases, the accelerometers are not necessarily good vibration sensors for relatively high frequency vibration.

SUMMARY OF THE INVENTION

According to the present invention, a single instrument is provided for sensing vibration in six degrees of freedom. The vibration sensor has a single proof mass or float which is capable of sensing translational motion along and rotational motion about three orthogonal axes. The proof mass or float is disposed within a housing and is electromagnetically suspended such that exterior surfaces of the proof mass are closely spaced from interior surfaces of the housing to permit limited freedom of motion of the proof mass and to contribute consistent dynamics over a large frequency range. Typically, the proof mass has a cylindrical shape, and is provided at each end with an axial suspension for limiting axial movement of the mass along a Z axis and a radial suspension for positioning the proof mass along X and Y axes orthogonal to the cylindrical Z axis. A signal generator/torque generator is provided to rotationally restrain the mass about the cylindrical axis. Each signal generator/torque generator includes two orthogonal pairs of oppositely disposed electromagnetic translation sensors and one such signal generator/torque generator is provided at each axial end of the proof mass to provide separate rotation sensing and restraint.

Excitation is provided to the sensing, restraining and suspending elements in a new circuit configuration which senses current in coils associated with each of the three possible axes of motion plus rotation. These currents are sensed, summed and differenced in a circuit network to yield both rotational and translational motion about each of the three orthogonal axes, six axes in all. At the same time motion is constrained through forces generated by the sensed motions so that little overall motion between internal parts is experienced.

In particular, a signal source is provided for separately energizing coils associtated with each axis in the signal generator/torque generator units, and with the axial suspension. Each pair of oppositely disposed electromagnetic coils in the signal generator/torque generator has a capacitively tuned resonant circuit. The currents in the diagonally opposite coils at each end of the mass are sensed and separately differenced, then combined with the sensed currents at the other end in separate differential and additive relationships to give an indication and control of X and Y axis translation and rotation of the proof mass. Similarly, the axial suspension system includes a capacitively tuned resonant circuit, the current in which is sensed and differenced to provide an indication and control of the axial displacement of the mass. The signal generator/torque generator secondary levels are sensed and summed to give Z axis rotational vibration and control.

The proof mass may be surrounded by a thin layer of fluid within the housing to provide some buoyancy but without introducing unknown mass motion, such a fluid is not necessary, however. Where a fluid is used, the proof mass is non-neutrally buoyant to permit measurement of translational accelerations. If a fluid is provided, the temperature of the reference mass and fluid is controlled so that the buoyant force is precisely known and vibration sensitivity does not change. The use of a non-neutrally buoyant reference mass, combined with six degrees of freedom sensing ability of a rigid body, permits linear and angular sensing of vibrational motion. No mechanical restraints are required, which tend to reduce sensitivity and reliability. Neutral buoyancy may be used to desensitize the instrument to translational vibration, while maintaining sensitivity to rotational translation.

DESCRIPTION OF THE DRAWING

The features of the present invention will be more clearly appreciated from the following, solely exemplary detailed description and the accompanying drawing in which:

FIG. 1 is a generalized diagrammatic representation of the proof mass of this invention;

FIG. 2 is a generalized diagrammatic representation of one end of the axial and radial suspension of the proof mass of FIG. 1;

FIGS. 2A and 2B are graphs representing the relationship between current, frequency and distance for the suspension of the mass of FIG. 1;

FIG. 6 is a schematic diagram of circuitry for detecting displacements about the X axis and rotation about the Y axis;

FIG. 7 is a schematic diagram of circuitry for detecting Y-axis displacement and rotation about the X axis;

FIG. 9 is an exploded view of a portion of FIG. 8 showing the housing and mass separated;

FIG. 10 is a diagrammatic representation of an active suspension for use in the present invention; and FIG. 11 shows a hybrid suspension winding system.

DETAILED DESCRIPTION OF THE PREFERRED EMBODIMENT

Figure 3:
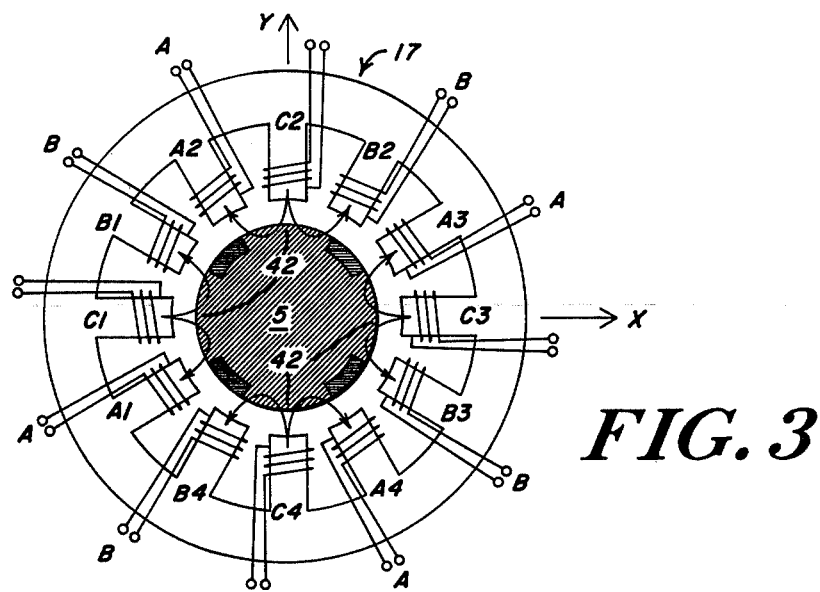
FIG. 3 is a pictorial representation of a signal generator/torque generator as used in the present invention.

With reference to the drawing and more particularly to FIGS. 1 and 2 thereof, there is shown a generalized diagrammatic representation of the proof mass associated with this invention. A proof mass 10 is electromagnetically suspended within a housing which is not shown in FIGS. 1 and 2 for purposes of clarity of explanation of operation. Proof mass 10 is closely spaced from interior surfaces of the housing to allow limited freedom of motion and may also be non-neutrally buoyant in a thin fluid layer placed between the housing and proof mass 10. Proof mass 10 includes left and right hand axial and radial suspension poles 8 (the right hand one being not shown) and left hand and right hand rotors 5 and 6 for respective signal generator and torque generators.

Proof mass 10 is supported radially by an independent radial suspension, the left hand, X axis structure 12 being shown in FIG. 2. The X axis suspension includes a stator 14 disposed on the housing and surrounding the pole 8 which is disposed on proof mass 10. An independent axial suspension stator 20 is also provided adjacent pole 8 for axial suspension thereof in combination with a similar structure at the opposite end. While a single pole 8 is shown for the suspension, it is to be noted that separate poles are possible. The Y axis radial suspension is not shown but would be the same as for the X axis suspension but disposed at a 90° angle with respect thereto.

FIGS. 2, 2A and 2B together illustrate the operation of the suspension wherein excitation is applied from one or more sources 11 through tuning capacitors 13', 13" and 13''', to respective coils 15', 15" and 15". Coils 15' and 15''' provide the opposed X-axis radial suspension, electromagnetic forces at the left end of the mass 10. Coil 15' provides the left half of the two, opposed electromagnetic axial suspension forces. Tuning is achieved by capacitors 13', 13" and 13''' for operation at the upper half power point 17 illustrated in FIG. 2A in a manner representing a typical resonance response curve in the current versus frequency domain. This curve transforms into the curve of FIG. 2B when shown in the current versus displacement domain. Operation at the half power point produces a net restoration magnetic force due to the rapid change in current in response to displacement of mass 10. Active or passive suspensions may be utilized.

Referring now to FIGS. 3, 3A, 4, 5, 6 and 8, a preferred configuration of the vibration sensing circuitry for X, Y and Z axis translation and rotation will be described using both suspension elements and signal generator/torque generator elements. At one end the signal generator/torque generator structure will operate as a signal generator and at the other end as a torque generator. Each such structure includes an E-type stator 17 surrounding a rotor 5. Stator 17 is formed from a magnetic material and has a plurality of poles, which should be typically 12 poles in four groupings of three poles each. In FIG. 3, each grouping of three poles is identified by a number 1, 2, 3 or 4, referring to the coil wound thereon and the center pole of each grouping is identified by the respective designations $C_1$, $C_2$, $C_3$ and $C_4$ for the associated coils thereon. One set of poles adjacent to the center poles is identified by the coils $A_1$, $A_2$, $A_3$ and $A_4$ wound thereon while the other set of adjacent poles is identified by the coils $B_1$, $B_2$, $B_3$ and $B_4$ wound thereon. Coils $C_1$–$C_4$ on the center poles are excited from a common signal source 40 (FIG. 4) so that the instantaneous flux is in the same direction for all of the these poles. Each of the A, B and C coils is wound in a manner consistent with signal and torque generators.

Rotor 5 is typically slotted to form four protruding poles 42. Each rotor pole 42 is associated with one stator pole grouping and spans the stator generally from the center line of a pole associated with the A coils across the center poles of the C coils to the center line of the next pole associated with the B coils. In its null position, rotor 5 is so located with respect to stator 17 that the center line of the rotor poles 42 is aligned with the center line of the C coil poles.

Figure 3A:
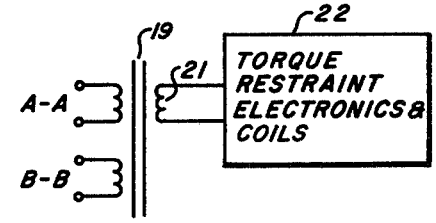
FIG. 3A is a schematic diagram of rotational restraint circuits for use with FIG. 3.

Each of the secondary pole coils A associated with each pole grouping is connected in series with the other secondary pole coils A and each of the secondary pole coils B is also connected in series. At a given instant, the flux in each primary or C pole passes from the stator into an associated rotor pole across the gap between them, and the flux leaves the rotor across the gap and passes back to the secondary A and B poles, all as shown in FIG. 3. The path is completed through the outer rim of the stator 17. Thus, with the C coils excited in each grouping, the voltages induced in each of the secondary coils A and B of each pole grouping will be additive. As shown in FIG. 3A, the series connection of the the A and B coils is provided to primary windings A-A and B-B of a transformer 19 such that the output on a secondary winding 21 reflects their difference and thus rotation about the Z axis. This output is applied to torque restraint electronics 22 and used to excite a similar signal generator/torque generator structure at the other end of the proof mass. This signal is also used to represent Z axis rotational vibration. In lieu of a transformer differencing circuit as shown in FIG. 3A, a bridge, similar to that of FIG. 4A can be built from the A and B coils.

Figure 4A:
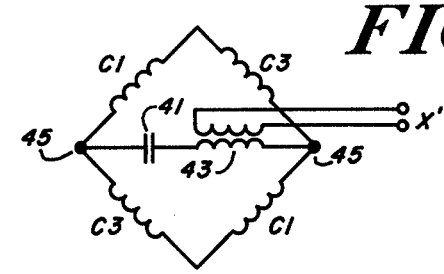
FIG. 4A is a schematic diagram of alternative displacement detection.
Figure 4:
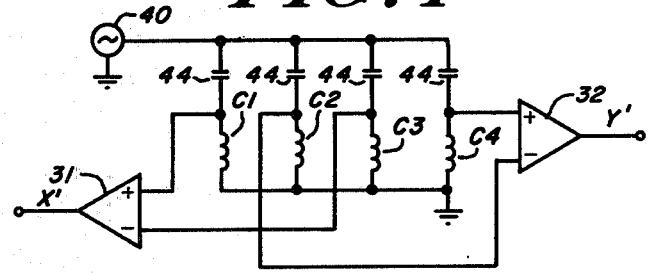
FIG. 4 is a schematic diagram of the signal generator/torque generator of FIG. 3 in combination with circuitry for detecting displacement along the Y axis.

For the purpose of X and Y axis vibration sensing, each of the primary stator pole coils C is preferably connected in series with a capacitor 44, as shown in FIG. 4. Each capacitor 44 serves to tune the center coils C, not for suspension purposes, but to enhance the variation in current through the coils C with displacement. For this reason the tuning need not necessarily be of the type illustrated in FIG. 2A.

The series connection of each center pole coil $C_1$, $C_2$, $C_3$, and $C_4$ and capacitor 44 is connected in parallel across source 40, as shown in FIG. 4. X axis motion or vibration will affect the current in coils $C_1$ and $C_3$ of groupings 1 and 3 oppositely. The voltage across those coils $C_1$ and $C_3$ are differentially combined in an amplifier 31 to give an indication of displacement along the X axis. This is done for each end of the proof mass producing outputs X' and X" (at the opposite end not shown). The voltages across coils $C_2$ and $C_4$ of groupings 2 and 4 are similarly differenced in amplifier 32 to give an indication of displacement along the Y axis as signals Y' and Y" (not shown) at each end of the proof mass.

An alternative scheme for detecting X axis displacement, X', is shown in FIG. 4A using a bridge. The pole coils C1 and C3 located in diagonally opposite poles of the stator 17, are each wound as two separate and identical secondary coils. A bridge is configured as shown in FIG. 4A with the separate coils of each pole connected in diagonally opposite bridge arms. X axis displacement is detected by measuring the signal between opposite junctions 45. For this purpose a capacitor 41 is series connected with the primary coil of a transformer 43 between the junctions 45. The secondary of the transformer 43 provides the X' output representing the X axis displacement at one end. Similar circuitry is used for Y axis displacement at each end and for the opposite end X axis displacement.

As shown in FIG. 6, the sensed displacements X', along the X axis at one end of the proof mass, are added to the sensed displacement X", along the X axis at the other end of the proof mass, and scaled with a gain of ½ by application of those signals to a summing amplifier 33 to give a total translation output of the mass along the X axis. Similarly, as shown in FIG. 7, the displacement Y', along the Y axis at one end of the proof mass is added and scaled by a summing amplifier 35 with the displacement Y", along the Y axis at the other end of the proof mass to give the overall Y translation for the proof mass.

Rotation about the Y axis is detected by differencing the displacements X' and X" along the X axis at each end of the proof mass and scaling by the distance "1", which is the spacing between the centers of the rotors 5 and 6 at opposite ends of proof mass 10 (FIG. 1) in a differential amplifier 34 shown in FIG. 6. The displacement Y" of the mass about the Y axis at one end of the proof mass is differenced with the displacement Y' about the Y axis at the other end of the proof mass and scaled by the distance "1" in a differential amplifier 36 to give rotation about the X axis, as shown in FIG. 7.

Figure 5:
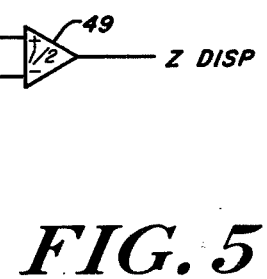
FIG. 5 is a schematic diagram of circuitry for use with the axial suspension to detect displacement along the Z axis.

Displacement along the Z axis is detected, as shown in FIG. 5, by sensing the current changes in axial suspension coils 37 and 39 as excited by a source 48 through tuning capacitors 46 and 47 at each end of the mass to provide the displacement of that end. The voltages developed across coils 37 and 39 are applied to inputs of a differential amplifier 49 and attenuated by one-half to provide the overall Z translational displacement. Coil 37 corresponds to coils 15" in FIG. 2 while coil 39 corresponds to the similar coil at the opposite end, not shown.

As a result, motion in six degrees of freedom, three translational and three rotational is provided at the outputs of amplifiers 49, 33, 34, 35 and 36 and of coil 21 of transformer 19. Vibration in these six degrees of freedom is provided by these outputs partially at higher frequencies above the system break point defined as the rotation of suspension spring constant to the mass 10 inertia.

Figure 8:
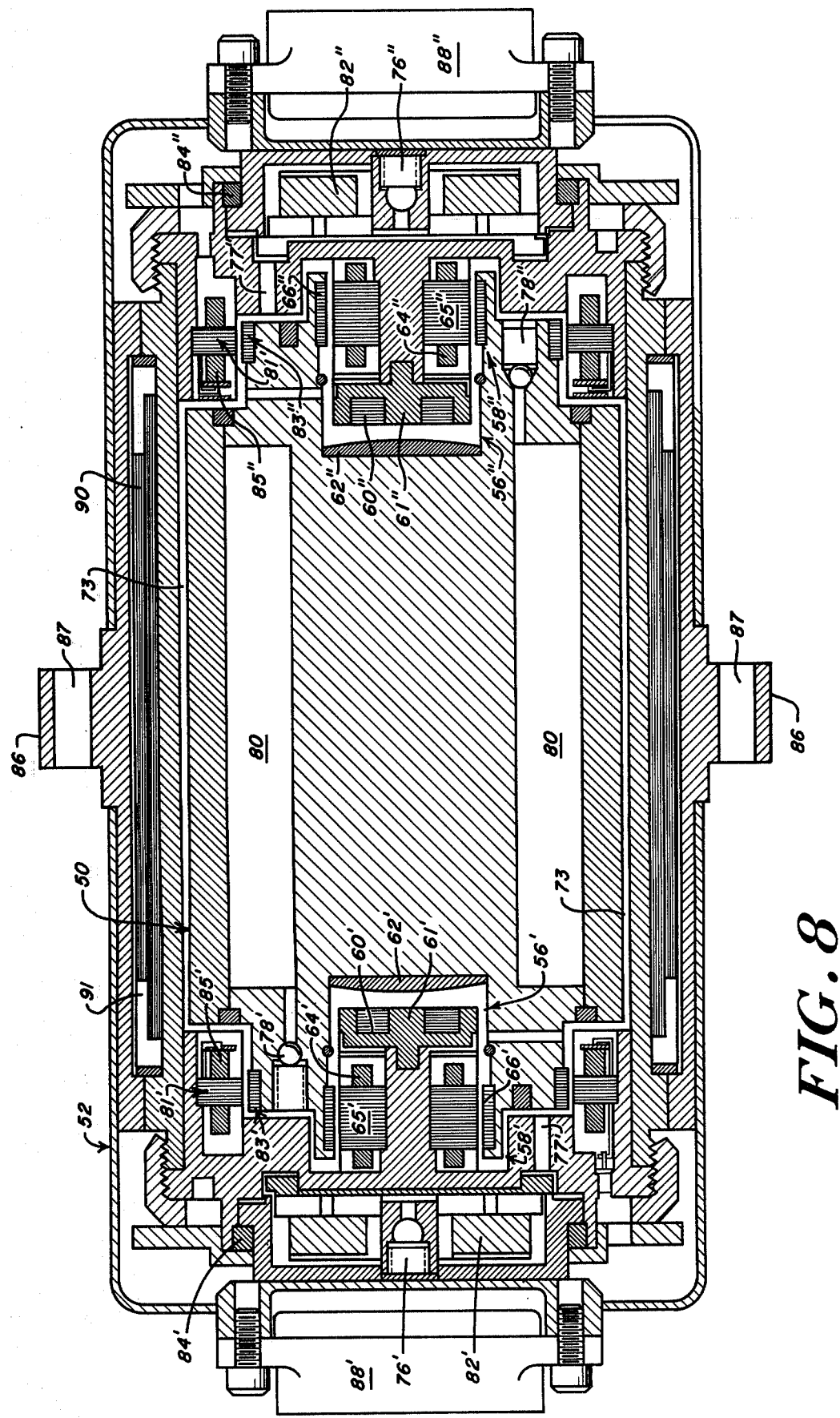
FIG. 8 is a cutaway, cross-sectional view of a typical vibration sensor of this invention.

With reference now to FIGS. 8 and 9, structural details of a preferred embodiment of the proof mass and housing along with associated coils is described. A proof mass 50, corresponding to mass 10, is electromagnetically suspended within a housing 52 by axial suspensions 56' and 56" and by radial suspensions 58' and 58" as described above. FIG. 9 shows the proof mass 50 and housing 52 separated for clarity. Each axial suspension 56' and 56" includes coils 60' and 60" around cores 61' and 61" of housing 52. Cores 61' and 61" face poles 62' and 62" disposed on mass 50. Radial suspensions 58' and 58" include coils 64' and 64" on cores 65' and 65" of housing 52 which are surrounded by poles 66' and 66" on mass 50. Axial suspensions 56' and 56" and radial suspensions 58' and 58" operate in a manner similar to the axial and radial suspensions discussed above.

The signal generator/torque generator structures include stators 81' and 81" facing rotors 83' and 83". Coils 85' and 85" are wound on stators 81' and 81" and may be the coils A, B, or C identified in FIG. 3.

Proof mass 50 is rigid and has a generally cylindrical shape. The exterior surface of mass 50 is spaced from the interior surface of housing 52 by a cavity 73 sufficient to permit limited freedom of motion of the mass 50. A typical thickness for cavity 73 is 0.01 inch. Although suspended electromagnetically as previously described, mass 50 may also be partially supported by a fluid in cavity 73. The fluid also serves to damp movement of the proof mass 50 relative to housing 52. Mass 50 should be other than at neutral buoyancy in the fluid to provide six axis operation. Neutral buoyancy may be used for three axis rotation detection. A non-corrosive gas may be applied as a filler to an annular cavity 80 within mass 50 via gas fill ports 78' and 78". Fluid fill ports 76' and 76" are provided at each end of housing 52 to permit application of the fluid to the cavity 73 via channels 77' and 77" if desired. Mass compensated bellows 82' and 82" are provided at each end of the housing 52, and sealing rings 84' and 84" effectively seals the cavity 73 within which mass 50 is located against fluid leaks. A flange 86 surrounds housing 52 to permit external mounting of the vibration sensor, through bolt holes 87, for sensing vibration transmitted to the housing. Axially disposed electrical connectors 88' and 88" are provided at each end to permit electrical connection to the coils. A thermal control layer 90 surrounds housing 52 in the vicinity of mass 50. Thermal control layer 90, typically including heating coils and a layer of insulation, is located within a cavity 91 and energized to maintain the components within housing 52 and mass 50 at a desired temperature. The completed unit further typically has its assembly screw flanges sealed with epoxy.

The proof mass of the present invention may be actively suspended, as shown in FIG. 10, in lieu of the passive suspension shown above where tuning of the suspension circuit produces a centering restraint. In FIG. 10, a proof mass 110 has suspension stators 112 and 114 which cooperate with a wound rotor such as shown in FIG. 3 or FIG. 4 to generate position signals at each end in both X and Y coordinates. In FIG. 10, the X coordinate signals are shown as X' and X" at opposite ends respectively. These signals are employed in a control circuit 120 to generate corresponding force signals FX' and FX" which are applied to wound stators to exert a restoring force on end poles 118 and 116 respectively of the proof mass, 110. The stator coils generating the restoring forces FX' and FX" are typically not tuned, but where they provide translation support, may alternatively be tuned. The sensing coils are typically tuned.

The active suspension noted above is capable of greater stiffness than conventional suspensions but usually at a loss of resolution. The gain of circuit 120 defines this sensitivity and stiffness and provides the necessary stability by conventional filtering techniques. Typically, the sensing coils are driven at a high frequency (19.2 KHz) and the sense output demodulated, amplified and stabilized and remodulated at a lower frequency (400 to 9600 Hz) to drive the restraint coils.

The coils on the stators used for active suspensions may be configured in a conventional manner, or provided with a hybrid configuration of two coils per pole. In one case, as shown in FIG. 11, a first coil is provided on each opposite X axis suspension of a rotor and each coil is excited with a current. A second coil is wound on each pole in a sense which permits a current serially applied to the second coils to produce, at opposite rotor poles, opposite effects on the magnetic field from the first coils. Thus, a current of one polarity in the second coils will increase the field at one set of rotor poles and decrease it at the other, producing a net force on the stator and proof mass. In FIG. 11, poles 130 and 132 on opposite ends are each wound with a coil 134 and excited by a source 136. A second set of coils 138 are wound in the same sense as coils 136 on poles 130 but in the opposite sense on poles 132. When coils 138 are excited by a current from a controller 140, a force will be exerted on a proof mass 142 corresponding to the polarity and magnitude of the current in coils 134.

The concept illustrated in FIG. 11 may be implemented with a modification to provide a combined active and passive suspension. For this purpose, the X axis suspension coils at one side and both ends are series connected and tuned as a passive suspension. The other X axis side is similarly connected to provide opposing suspension force. X and Y axis rotation is then actively restrained by sampling the voltage of the SG/TG radial transducer and developing a current coupled oppositely into the coils at each end in the manner shown in FIG. 11 to produce an X and Y axis torque.

In another embodiment, the signal generator is operated at one frequency while torque generation uses another frequency, permitting dual use of the same poles for signal and torque generation. Time sharing techniques can also be used to multiplex the same pole structure. In gyroscopes, such combining of functions is normally disadvantageous because gyroscopes must operate to sense very low frequencies, essentially steady state effects. The accelerometer of the present invention can ignore these low frequency effects and is not harmed by such function combining. Instead, it becomes advantageous in reducing components. Where the low frequency performance is less critical, the multi axis concept of the present invention may be used in a gyroscope to extend its bandwidth and to provide a two axis inertial sensor.

In a further embodiment, the torque generator stator can use a permanent magnet rather than a coil to induce the primary magnetic field which interacts with the secondary field produced by the torque signal. In the case of a passive suspension, the permanent magnet structure may be used as one end of the signal generator/torque generator combination. If an active suspension is used, the permanent magnet torque generator is placed about the center of the proof mass with drive coils on the housing. The two ends act as signal generators and active suspension pickoffs.

While the housing and mass structure of this vibration sensor has been adapted from single degree of freedom gyroscope designs, important differences exist. This sensor lacks the wheel and the requirement of mass floation present in the gyroscope. No flex leads of the type used with gyroscopes and liable to cause error forces are required between the float and housing in the vibration sensor. A gyroscope is required to sense D.C. inertial shifts in a single degree of freedom and avoid sensitivity to other motions. The sensing of vibration does not require the same accuracy in shifts as does a gyroscope, but it must provide multiple axes of sensitivity and consistent dynamics over a large frequency range. For this purpose the electronics of the vibration sensor are wholly distinct from any used in the gyroscope field as they must be in order to sense six degrees of motion. The suspension character of the float relative to the housing is tailored to permit sensitivity to the six degrees of motion being detected. At the same time, where possible, it is desired to use gyroscope quality magnetic structures. The combination of stiffness and low damping permits a float according to this invention to become erected into operating position by the suspension, more rapidly.

The fluid viscosity and fluid gaps between housing and mass as well as the suspension stiffness can both be varied to affect the resolution and break point of the vibration sensor. Other variations include tuning of the signal generator/torque generator elements to act as suspensions themselves as well as vibration sensors, thereby avoiding separate suspensions.

The above description is exemplary, and modifications and improvements are intended to fall within the scope of this invention as defined solely in the following claims.

What is claimed is:

1. A multiaxial vibration sensor comprising:
 a float;
 a housing closely surrounding said float and permitting limited freedom of motion of said float within said housing;
 means responsive to excitation for electromagnetically constraining said float within said housing without physical contact therebetween against translational and rotational motion;
 means for applying excitation to said constraining means;
 means responsive to a characteristic of said excitation for providing an indication of vibration applied to said housing; and
 said constraining means further including means responsive to said indication of vibration for applying forces to said float to restrain relative motion between said float and said housing.

2. The multiaxial vibration sensor of claim 1 wherein said indication providing means includes means for sensing three axes of translation.

3. The multiaxial vibration sensor of claim 1 or 2 wherein said indication providing means includes means for sensing three axes of rotation.

4. The multiaxial vibration sensor of claim 1 wherein said constraining means includes a signal generator/torque generator stator/rotor combination providing constraint against rotation of said float about a first axis.

5. The multiaxial vibration sensor of claim 4 wherein:
said signal generator/torque generator includes:
a first set of oppositely disposed, wound stator poles and rotor poles operative as electromagnetic rotation sensors; and
a second set of oppositely disposed, wound stator poles and rotor poles operative as electromagnetic rotation sensors and positioned orthogonally about said float from said first set;
means for exciting each of said first and second sets;
means for detecting a signal representing the response to excitation of each individually excited set; and
means for combining the detected signal to provide an indication of vibrational, translation and rotation about two axes, each orthogonal to said first axis.

6. The multiaxial vibration sensor of claim 5 wherein: each of said first and second sets includes opposed stator coils and a capacitor in series therewith, each such series connected being excited in parallel; and
said detecting means includes means for sensing the signal between said stator coil and corresponding capacitor.

7. The multiaxial vibration sensor of claim 4 wherein said indication providing means includes means responsive to the rotational constraint about said first axis for providing an indication of rotational vibration about said first axis.

8. The vibration sensor of claim 4, wherein said combination includes a permanent magnet torque generator.

9. The multiaxial vibration sensor of claim 1 wherein said constraining means includes a tuned, three axis electromagnetic suspension.

10. The multiaxial vibration sensor of claim 9 wherein said indication providing means comprises means for sensing excitation applied to produce suspension of said float along said first axis as an indication of vibration along said first axis.

11. The vibration sensor of claim 1 wherein said excitation applying means includes an active suspension control circuit.

12. The vibration sensor of claim 1 wherein:
said constraining means includes a pole structure having first and second sets of coils thereon, half in an aligned sense and half in an opposing sense; and
said excitation applying means includes means for exciting said first set of coils with a first current and said second set of coils with a variable current of a magnitude and polarity corresponding to a characteristic of said excitation.

13. The vibration sensor of claim 1 further including fluid means for floating said float within said housing substantially at neutral buoyancy.

14. The vibration sensor of claim 1 wherein said constraining means is operative to provide erection of said float within said housing from an unexcited condition.

15. A vibration sensor comprising:
a float of a generally cylindrical form and having a cylindrical axis;
a housing for containing said float within a cavity thereof and providing for movement of said float within the cavity of said housing of a closely limited extent;
said limited motion including axial and radial motion of said float within said housing whereby the axial and radial gaps through said cavity between said float and said housing at the ends thereof can be made to vary independently along said float axis and two radial axes orthogonal to said float axis, or combinations thereof;
means for sensing motion of said float with respect to said housing along said float axis to provide an axial vibration signal;
means for sensing the motion of said float with respect to said housing at each end thereof along said radial axes to provide a set of radial axis signals;
means for combining said radial axis signals to provide an indication of rotational and translational motion of said float with respect to said housing along and about said two radial axes, both orthogonal to said float axis;
means for sensing rotation of said float about said float axis to provide an indication of rotational motion of said float about said radial axis.

16. The vibration sensor of claims 1 or 10 further including fluid means for floating said float within said housing at other than neutral buoyancy.

17. The vibration sensor of claim 15 wherein:
said means for sensing axial motion includes rotor/stator elements of an axial suspension; and
means are provided for providing axial suspension of said float within said housing through said rotor/stator elements.

18. The vibration sensor of claim 15 wherein:
said means for providing said radial axis signals include a signal generator/torque generator structure provided at opposite ends of said float and on facing portions of said housing; and
said means for sensing rotation includes means for exciting at least one of said signal generator/torque generator structures to provide as an output of said at least one structure a signal representing relative rotation between said float and said housing.

19. The vibration sensor of claim 15 wherein said means for producing said radial axis signals includes rotor/stator means for producing radial suspension of said float within said housing.

20. The vibration sensor of claim 15 further including:
means for providing radial suspension of said float within said housing independently of said means for providing said radial axis signals.

21. The vibration sensor of claim 20 wherein:
said means for sensing axial motion includes rotor/stator elements adapted for providing axial suspension of said float within said housing; and
means are provided for providing excitation of said rotor/stator elements to provide said axial suspension.

22. The vibration sensor of claim 21 wherein said rotor/stator elements for axial suspension are independent of the rotor/stator elements for said radial suspension.

23. The vibration sensor of claims 15, 17, 18, 19, 20, 21 or 22 further including a floatation fluid within said cavity between said float and said housing providing a non-neutral buoyancy of said float within said housing.

* * * * *